(12) United States Patent
Kupiainen

(10) Patent No.: US 6,798,882 B2
(45) Date of Patent: Sep. 28, 2004

(54) MOBILE STATION

(75) Inventor: Juhani Kupiainen, Espoo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/770,334

(22) Filed: Jan. 26, 2001

(65) Prior Publication Data

US 2001/0031049 A1 Oct. 18, 2001

Related U.S. Application Data

(63) Continuation of application No. 09/043,691, filed as application No. PCT/FI96/00515 on Sep. 30, 1996, now abandoned.

(30) Foreign Application Priority Data

Sep. 28, 1995 (FI) .................................................. 954621

(51) Int. Cl.$^7$ .............................................. H04M 1/00
(52) U.S. Cl. ............................ 379/433.04; 379/433.07; 379/433.13
(58) Field of Search ....................... 379/433.12, 433.13, 379/433.07, 433.04, 368; 455/90.3, 575.3, 557

(56) References Cited

U.S. PATENT DOCUMENTS

| | | | |
|---|---|---|---|
| 5,170,494 A | 12/1992 | Levanto | ........................ 455/90 |
| 5,189,632 A | 2/1993 | Paajanen et al. | ........ 364/705.05 |
| 5,214,309 A | 5/1993 | Saarnimo | ..................... 257/712 |
| 5,229,701 A | 7/1993 | Leman et al. | ................... 320/2 |
| 5,253,146 A | 10/1993 | Halttunen et al. | .......... 361/784 |
| 5,265,158 A | 11/1993 | Tattari | ........................ 379/433 |
| 5,271,056 A | 12/1993 | Pesola et al. | .................. 379/58 |
| 5,303,291 A | 4/1994 | Takagi et al. | ................ 379/433 |
| 5,361,459 A | 11/1994 | Hyvonen et al. | ............... 24/35 |
| 5,584,054 A * | 12/1996 | Tyneski et al. | ......... 455/575.03 |
| 5,603,103 A | 2/1997 | Halttunen et al. | ............. 455/90 |
| 5,642,402 A | 6/1997 | Vilmi et al. | ................... 379/58 |
| 5,646,649 A * | 7/1997 | Iwata et al. | .................. 455/575 |
| 5,669,069 A | 9/1997 | Rautila | ........................ 455/558 |
| 5,692,032 A | 11/1997 | Seppanen et al. | ............. 379/59 |
| 5,719,799 A | 2/1998 | Isashi | ..................... 364/705.01 |
| 5,797,089 A * | 8/1998 | Nguyen | ..................... 455/557 |

FOREIGN PATENT DOCUMENTS

| | | |
|---|---|---|
| DE | 4108169 C2 | 9/1991 |
| JP | 6-164440 | 6/1994 |

* cited by examiner

*Primary Examiner*—Jack Chiang
(74) *Attorney, Agent, or Firm*—Perman & Green, LLP

(57) ABSTRACT

A dual function mobile station is constructed with first input and first display, which are used in the first functional mode, and second input and second display that are used in the second functional mode. The orientation of the mobile station in the second mode of operation is transverse to the orientation of the mobile station in the first mode of operation.

3 Claims, 2 Drawing Sheets

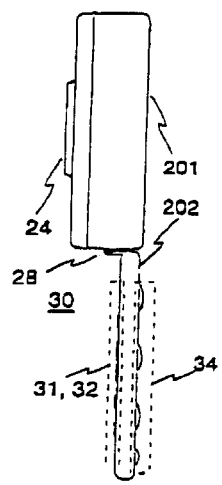
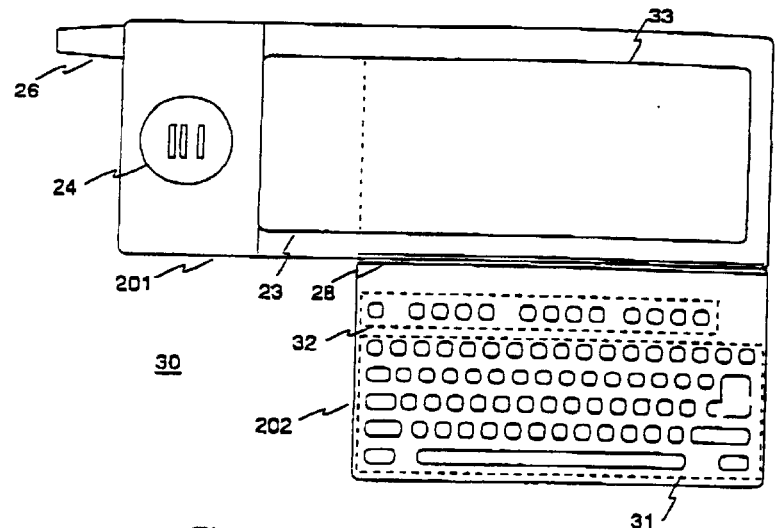
FIG. 3B  FIG. 3A
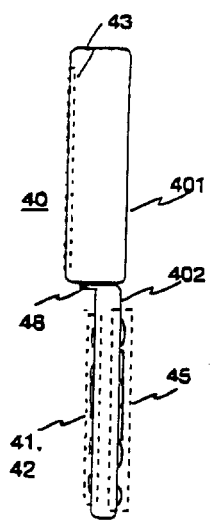
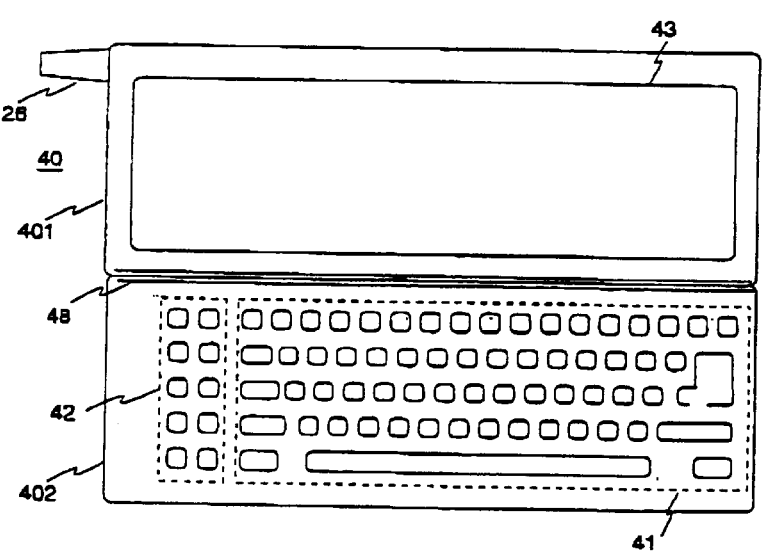
FIG. 4B  FIG. 4A

MOBILE STATION

CROSS-REFERENCE TO RELATED APPLICATION

This is a continuation of U.S. patent application Ser. No. 09/043,691 filed Mar. 26, 1998, now abandoned, which is a 371PCT/FI96/00515, filed Sep. 30, 1996.

BACKGROUND OF THE INVENTION

1. Field of the Invention

The objective of the invention is a mobile station and especially its user interface as well as a method for the input and display of information in a mobile station. The mobile station means, in this context, any mobile station that can be connected to a communication system such as a mobile station that can be connected to a cellular system. A connection to a communication system means here a wireless connection such as a connection that is achieved by a radio interface.

2. Brief Description of Prior Developments

A mobile phone and a fixed network telephone have previously been used mainly for transfering speech, but nowadays the mobile stations of the communication systems are used more and more also for transferring and processing data such as character data. Additionally the mobile station can be used for controlling service functions that are offered by the communication system. These more developed functions set special requirements on the user interface of the mobile station.

FIG. 1 shows a prior known mobile phone. The user interface of a mobile station 10 usually comprises a numeric keypad 11, function keypad 12 and a display 13. The numeric keypad comprises number keys (0–9), which are used for inputting to the mobile station the telephone number, into which a connection is desired. In addition the numeric keypad generally comprises a few symbol keys. The function keypad is used for activating functions of the mobile station or the communication system. FIG. 1 also shows an earpiece 14, a microphone 15 and an antenna 16 of the mobile station.

A mobile station 10 is used in e.g. the following way for forming a connection. The station is connected into an active mode with a key of the function keypad 12, after which the mobile station creates a connection to a base station that is further connected to other parts of the mobile network. After this one uses numeric keys 11 of the mobile station for inputting a subscriber code such as a telephone number of the subscriber that one wants to have connection to. The input number is shown on the display 11 of the mobile station in order to check that the number is correctly input. After this one presses a connection key, which activates the mobile station to transmit the subscriber code information to the base station. Then the mobile network forms a connection to another mobile station that corresponds to the selected subscriber code.

In addition to ordinary calls it is possible to use a mobile station for transferring also short messages of a text form, telefax messages or data especially in digital cellular systems. The data to be transmitted or received can be processed in the mobile station or in a computer that is connected to the mobile station. Since the mobile station usually has an efficient processor, it is possible to make the input, processing and storing functions of simple text messages in the mobile station. While the mobile stations further develop, they can be used for further information processing in future, and thus they will serve also as computers. The mobile stations will also be used as mass media, in which case public text information such as news is sequentially transferred into the mobile station.

When transferring text information one should have as much as possible of text shown in the display so that processing even a long text would be easy. However, in the mobile stations of the prior art the amount of text that is fitted into the display is very small, because the main part of the front panel user surface is used for the keypad, earpiece and microphone, and thus the area that remains usable for the display is small. Since only small amounts of text information is suited to the display, it is difficult to go through and process large amounts of information, because the information must be transferred to the display in small parts. Then visualizing the information as a whole is also difficult.

Transmitting the text information requires a possibility to input letters and special symbols in addition to inputting just numbers. As the mobile stations are made as small as possible, the number of keys are minimized. This is due to the fact that if the number of keys would be large, the size of the key buttons and their mutual distance would be so small that the use of the keypad in an ordinary speech call mode would be difficult. In a speech call mode the mobile station is often used with one hand only, and therefore it should be easy to press the buttons without a danger of activating the nearby buttons by accident. So if the front panel of the mobile station would be equipped with a button for each alphabet and number character, the size and distance of the buttons would be so small that using the keypad for ordinary speech calls would be very difficult.

Inputting text is solved in the prior art in such a way that the keys that are reserved for the numerals are also used for inputting letters. For this purpose there are three letters marked into each numeric key in addition to the number. Inputting the letters is done in the following way:

Pressing a specific function key of the mobile station sets the keypad into a mode for inputting letters. After this, when a number/letter key is pressed for the first time, this causes the first letter that is marked on the key button to transfer into the memory an the display of the equipment. If the key is quickly pressed for a second time, the letter in the memory and in the display is changed into the second letter that is marked on the key button. If the key is still quickly pressed for a third time, the letter in the memory and in the display is changed into the third letter that is marked on the key button. If after pressing the key one waits for a predetermined time, the letter shown on the display is determined to be the input letter, and the mobile station starts then to wait for the next letter input. This way it is possible to input any of the letters that are marked on the key button by pressing the key one, two or three times, wherein the time between the pressings must be less than a predetermined time length. After this one has to wait at least the said time before inputting the next letter.

The prior known solution that was explained above has many disadvantages. Firstly, inputting one letter requires in average pressing a button twice. Secondly, one must wait for at least a predetermined time between inputting two letters. In concequence the writing becomes very slow. Additionally it is not quite easy to estimate the time between the pressings, and therefore there may become a lot of mistakes while writing. There is also a problem with this solution that writing both numbers and letters into the text is very difficult, because it requires changing the input mode of the mobile station alternately into numeric input mode and into letter input mode. Additionally it is not at all possible to input special symbols in this solution.

As was mentioned above, it is possible to use a computer that is connected to the mobile station for processing the texts to be transferred. The user interface of a computer usually comprises a alphanumeric keyboard and a large display. In this case the mobile terminal equipment for transferring speech and data comprises a mobile station and a laptop computer. However, carrying and using this kind of a combination is very troublesome, because the equipment is constructed of two separate devices that are connected with a cable. And the carriable computers are also relatively large and heavy. One has to reserve a lot of table space when using the combination. Additionally starting the programs of the computer requires time.

The need of processing text information is increasing also in the fixed terminal equipment. Several services are offered via telephones, where selections are carried out with the keypad of the telephone. However, the numeric keypad is quite restricted as an input means. Additionally there are several services, such as banking services, which would require a large display for showing the received information, such as a statement of account. One prior art solution would be a combination of a telephone and a computer, where the text information would be transferred with the computer, and the telephone is used for a speech connection. However, this would be too large and too expensive equipment in many cases.

Based on what is explained above one can see that it is not possible with the prior art to implement an easy-to-use and inexpensive mobile station for transferring both speech and text/data.

SUMMARY OF THE INVENTION

The purpose of the invention is to create a mobile station, which has an easy-to-use user interface and with which it is possible to avoid the described disadvantages of the prior art.

One idea of the invention is that the terminal equipment according to the invention has two functional modes. The first functional mode is preferably used, when the terminal equipment is used for transferring speech, and the second functional mode is preferably used, when the terminal equipment is used for processing or transferring text information or other data.

The user interface according to the present invention is preferably performed in such a way that the terminal equipment comprises first display means and second display means, wherein in the first functional mode the information is presented on the first display means and in the second functional mode the information is presented on the second display means. The second display means are preferrably larger than the first display means, and the second display means are preferrably covered in the first functional mode. As the terminal equipment is then used for transferring speech information in the first functional mode, the whole front surface of the equipment can be used effeciently for the first display and input means that are used in the first functional mode.

The terminal equipment according to the invention has preferrably also first input means for inputting information in the first functional mode and second input means for inputting information in the second functional mode. Then the second input means are preferrably covered in the first functional mode so that the user surface of the equipment can be efficiently used for the first input means and the first display means that are used in the first functional mode.

Let us note that the input information means here, except information that is transferred between the terminal equipment and the communication system, also e.g. the information that controls the mobile station and communication network and that is input to the mobile station.

The terminal equipment according to the invention preferrably comprises at least two parts that move relative to each other, wherein the parts have a first mutual position in the first functional mode and a second mutual position in the second functional mode. The input means and the display means can then be placed into the parts that are movable relative to each other in such a way that in the first functional mode the user surface of the equipment comprises the first input and display means and in the second functional mode the user surface of the equipment comprises the second input and display means.

The terminal equipment according to the invention is characterized in what is presented in the characterizing part of claim(s) 1 and/or 8. The method according to the inventon is characterized in what is presented in the characterizing part of claim(s) 24 and/or 25. Preferrable embodiments of the invention are presented in the dependent claims.

BRIEF DESCRIPTION OF THE DRAWINGS

The invention is next further explained with the attached drawings, in which

FIG. 3a shows a front view of a mobile station according to the invention in the second functional mode, where the mobile station has one display unit, FIG. 3b hows an end view of a mobile station according to the invention in the second functional mode, where the mobile station has one display unit, FIG. 4a shows a front view of a mobile station according to the invention in the second functional mode, where the mobile station has two display units, FIG. 4b shows an end view of a mobile station according to the invention in the second functional mode, where the mobile station has two display units.

DETAILED DESCRIPTION OF THE PREFERRED EMBODIMENT

Figure 2A:
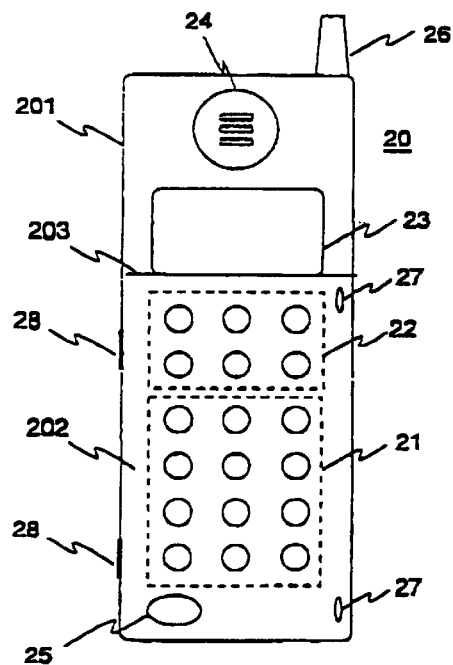
FIG. 2a shows a front view of a mobile station according to the invention in the first functional mode, where the mobile station has one display unit.
Figure 2B:
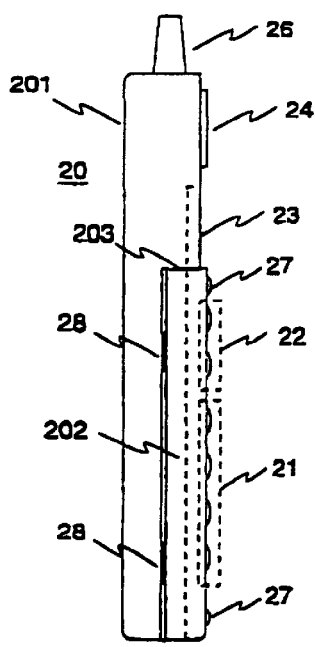
FIG. 2b shows a side view of a mobile station according to the invention in the first functional mode, where the mobile station has one display unit.

FIG. 2a and FIG. 2b show a mobile station according to the invention in a first functional mode. In FIG. 2a the mobile station 20 is shown from the front and in FIG. 2b the mobile station 20 is shown from the side. The mobile station has two parts, first part 201 and second part 202, which are attached to each other with hinges 28 or some similar attachment means in such a way that the first part and the second part can be moved relative to each other aroung the attachment means. The edge of the second part 202 is marked 203 in the figure. The second part can be turned around the hinges e.g. 180 degrees relative to the first part.

The first part 201 comprises a display 23, earpiece 24 and an antenna 26. The numeric keypad 21, the functional keypad 22 and the microphone 25 are situated in the second part 202. In the first functional mode the mobile station can be used e.g. for forming a connection and for transferring speech as in an ordinary mobile telephone as was described above in the context of describing the prior art.

FIG. 3a and FIG. 3b show the mobile station that was presented in FIGS. 2a and 2b in the second functional mode, in which parts 201 and 202 have been turned open relative to each other. In FIG. 3a the mobile station is shown from the front and in FIG. 3b the mobile station is shown from the end. In the second functional mode the user interface comprises a alphanumeric keypad 32 and a second display 33. The first display 23 and the second display 33 form in this solution one consistent display. In the first functional mode the text information is presented on the display in such a way that the text is in a horizontal position, when the mobile station is in a vertical position. In the second functional mode the text information is in a horizontal position, when the mobile station is in the horizontal position. Thus the characters are presented on the display in two positions that are perpendicular relative to each other, depending on the functional mode. Presenting the information in two different positions makes the reading of the text information easier, because this way the visible part of the display is in a horizontal position in both functional modes.

The displays can also be implemented in such a way that, although displays would be constructed of a single display component, the part that functions as the first display is not used in the second functional mode. In this case it is possible for example to attach a transparent protection sheet that in the first functional mode highers the front surface of the display to the level of the surface of the keypad that is used in the first functional mode.

From FIGS. 2a and 3a one can see that when speech connection is used, the mobile station comprises an ordinary user interface, which has large size, easy-to-use numeric keys. On the other hand, when text/data information is transferred, the user interface comprises a large size display and an alphanumeric keypad, which may also have special character keys. Since the size of the mobile phone and thus also the size of the alphanumeric keypad is smaller than the size of ordinary alphanumeric keyboards that are used in computers, it is preferrable to use the alphanumeric keypad of the mobile station with a pointer pen.

FIG. 4a and FIG. 4b show another mobile station according to the invention in a second functional mode. Also this mobile station 40 is constructed of two parts, first part 401 and second part 402, which are attached to each other with hinges 48. In the second functional mode the user interface of the mobile station 40 comprises a display 43 in the first part 401 and an alphanumeric keypad 41 and a function keypad 42 in the second part 402.

Figure 1:
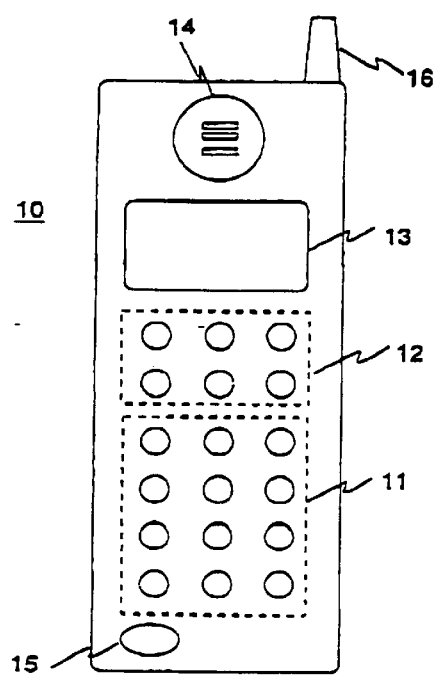
FIG. 1 shows a mobile station according to the prior art.
Figure 5:
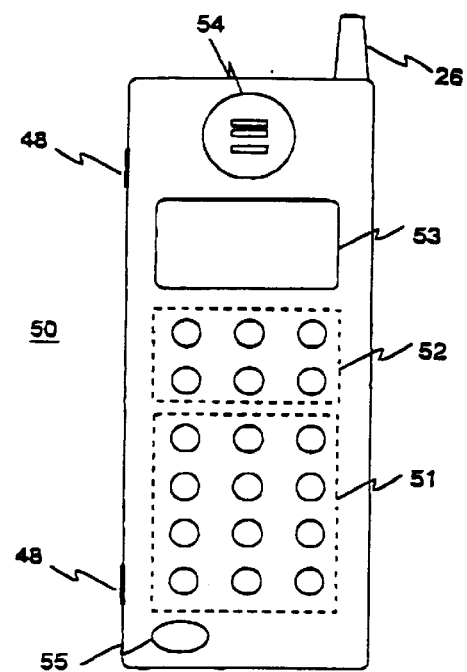
FIG. 5 shows a mobile station according to the invention in the first functional mode, where the mobile station has two display units.

The mobile station 40 is set to the first functional mode by turning the second part on the first part, which makes the keypads 41 and 42 and the display 43 to become covered. The mobile station in the first functional mode is shown in FIG. 5. In the first functional mode the first half of the second part forms the front surface of the mobile station. This first half of the second part comprises the user interface means of the first functional mode. These user interface means of the first functional mode comprise a numeric keypad 51, selection keypad 52 and a display 53. Additionally FIG. 5 shows an earpiece 54, a microphone 55, an antenna 56 and hinges 58.

The keypads 41 and 42 and the display 43 that are used in the second functional mode can also be situated in the equipment in such a way that the keypads 41 and 42 are in the first part 401 and the display 43 is in the second part 402. In this case the equipment is naturally used so that the first part 401 is nearer to the user.

The mobile station of FIGS. 2a, 2b, 3a and 3b has an advantage that the displays that are used in the first and second functional modes can be realized with a single display, which is partly covered by the second part in the first functional mode.

The mobile station that is shown in FIGS. 4a, 4b and 5 has an advantage that in the second functional mode both the display and the keypads are as large as possible; they maximally use the front surface of the mobile station.

If the terminal equipment is not often used for inputting text, the equipment can also be realized without the second keypad, in which case the second display is only used for viewing the incoming messages.

In the previously presented embodiments the display means can preferably be e.g. an LCD (Liquid Chrystal Display), a fluorescence display or an electroluminiscence display. The second display to be used for processing and transferring text, data etc. has preferably a larger surface area than the first display to be used when transferring speech. Due to the purpose of use the relation of the display surface areas is preferrably at least two.

The input means can be e.g. a keypad that is made of mechanical key buttons, or a membrane keypad. The display and the keypad can also be implemented as a combined touch screen, with which information is input by touching the certain places of the touch screen with a pointer pen. In this case the display shows the areas to be touched and the symbols of the functions that are activated by touching said areas. The touch screen can be implemented as known in the art e.g. with an LCD and transparent resistive membranes that are placed on the display.

The first part and the second part of the mobile station can be attached to each other, instead of using hinges, also by other attachment means that allow a mutual movement. The first part and the second part can also be disconnectable from each other, which makes it possible to place the display part and the keypad part further from each other in the second functional mode. This makes using the equipment easier in the second functional mode, as in inputting text, because the keypad part and the display part can be placed independently from each other to suitable distances from the user.

Transferring signals and operating voltage between the first part and the second part can preferably be made with e.g. flexible flat cable. If the first part and the second part are mechanically disconnectable from each other, the signal transfer can be implemented wirelessly e.g. with infra red data transfer or inductive data transfer. In the infra red data transfer the data to be transferred is modulated into the infra red beam, and in the inductive data transfer the data is modulated into a magnetic field that is created between the parts. If wireless data transfer is used between the first part and the second part, both parts need an own electricity supply such as an accumulator. Since the wireless data transfer generally consumes more energy that a wired data transfer, it is preferrable always to use wired data transfer in the first functional mode between the parts. If the first and second parts are separate in the second functional mode, the parts can be connected in the first functional mode so that the parts have connectors, which are connected with each other in the first functional mode. Then in the first functional mode the signals can be transferred between the parts via this pair of connectors.

Additionally a solution is possible, where the first part and the second part are otherwise mechanically separable except that the data transfer between the parts is made with a cable that is connected between the parts. In this case the mutual position of the parts can be changed in the within the mutual distance that is determined by the cable length. Still due to the wired data transfer one can avoid the higher power consumption of the wireless data transfer.

With the solution according to the invention it is possible to achieve several advantages compared to the prior art. The equipment is small when thinking of carrying and of using it for transferring speech. Thus it is easy to handle the mobile station according to the invention when making a connection, when talking to the mobile station and when carrying the mobile station. In addition the keypad and the display for ordinary mobile phone use can be designed clear. Correspondingly the fixed mobile station according to the invention requires little table or other placing surface, and also there the it is possible to design the display and the keypad simple for ordinary speech use.

For more advanced functions such as processing transmitting and receiving text messages, there is a large sized display available, where a large amount of text is fitted. This way it is easy to read the text, since there is a larger set of text on the display at a time. Secondly, the text input can be made with an ordinary type alphanumeric keypad, a type of which is also used in other text processing equipment and the use of which does not require specific training. This way the text input is faster and the input mistakes remain few. Additionally an ordinary alphanumeric keypad gives a possibility for using special characters and numbers in a text without changing the functional mode between the input of characters. Also the function keys that are characteristic to computer keypads can be included with the alphanumeric keypad.

If some of the mobile station users use the mobile station only as a phone, this kind of users only need to learn the simple user interface for the speech use.

Some applications and embodiments of the method according to the invention have been presented above. Naturally the principle of the invention can be modified within the scope of protection that is determined by the patent claims, e.g. concerning the details of implementation and the areas of use.

What is claimed is:

1. A mobile station, which has a communication mode and a text mode, the mobile station comprising:

a first part and a second part, said parts being relatively movable into an open position, wherein said parts are adjacent to each other, and into a closed position, wherein said second part overlaps said first part;

a display, for displaying information in the communication mode and in the text mode, constructed in said first part, said display having at least a partially exposed portion in said closed position and wherein said entire display is exposed in said open position;

a first keypad for inputting information in the communication mode, constructed in said second part for access in said closed position;

a second keypad for inputting information in the text mode, constructed in said second part for access in said open position;

wherein the at least partially exposed portion of said display and the first keypad have a same first characteristic orientation of use in said closed position;

wherein the entire display means and the second keypad have a same second characteristic orientation of use in said open position, wherein said first and second characteristic orientations are perpendicular to each other; and wherein said mobile station is switched from said communication mode to said text mode by moving said parts between said closed position to said open position.

2. A mobile station according to claim 1, wherein said second part is constructed with an outer surface and said first keypad is constructed therein.

3. A mobile station according to claim 1, wherein said second part is constructed with an inner surface and said second keypad is constructed therein.

* * * * *

UNITED STATES PATENT AND TRADEMARK OFFICE
CERTIFICATE OF CORRECTION

PATENT NO.    : 6,798,882 B2
DATED         : September 28, 2004
INVENTOR(S)   : Juhani Kupiainen It is certified that error appears in the above-identified patent and that said Letters Patent is hereby corrected as shown below:

Title page,
Item [54], Title, "MOBILE STATION" should be -- DUAL FUNCTION MOBILE STATION WITH TRANSVERSE PIVOTING KEYBOARD --

Signed and Sealed this

Eighth Day of March, 2005

JON W. DUDAS
*Director of the United States Patent and Trademark Office*